US012168384B2

(12) United States Patent
Yoshinaga et al.

(10) Patent No.: US 12,168,384 B2
(45) Date of Patent: Dec. 17, 2024

(54) VEHICLE COOLING DEVICE

(71) Applicant: HONDA MOTOR CO., LTD., Tokyo (JP)

(72) Inventors: Nariyuki Yoshinaga, Tokyo (JP); Kanae Okuma, Tokyo (JP); Takahiro Koizumi, Tokyo (JP); Yasutomo Kimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 17/680,342

(22) Filed: Feb. 25, 2022

(65) Prior Publication Data
US 2022/0305873 A1 Sep. 29, 2022

(30) Foreign Application Priority Data

Mar. 23, 2021 (JP) .................. 2021-048802

(51) Int. Cl.
*B60H 1/00* (2006.01)
(52) U.S. Cl.
CPC ..... *B60H 1/00028* (2013.01); *B60H 1/00278* (2013.01); *B60H 2001/00085* (2013.01); *B60H 2001/00128* (2013.01)
(58) Field of Classification Search
CPC ........... B60H 1/00028; B60H 1/00278; B60H 2001/00085; B60H 2001/00128; B60H 1/00521; B60H 2001/00614; B60H 1/00285; B60H 1/00499; B60H 1/143
USPC ......................................................... 454/69
See application file for complete search history.

(56) References Cited

U.S. PATENT DOCUMENTS

| | | | |
|---|---|---|---|
| 6,145,458 A * | 11/2000 | Hattori | B63B 34/10 114/55.57 |
| 2001/0030069 A1 | 10/2001 | Misu et al. | |
| 2007/0040418 A1 | 2/2007 | Ohkuma et al. | |
| 2011/0089724 A1 | 4/2011 | Kato | |

(Continued)

FOREIGN PATENT DOCUMENTS

| | | |
|---|---|---|
| CN | 1899883 | 1/2007 |
| CN | 102039812 | 5/2011 |

(Continued)

OTHER PUBLICATIONS

Japanese Office Action for Japanese Patent Application No. 2021-048802 mailed Dec. 23, 2022.

(Continued)

*Primary Examiner* — Avinash A Savani
*Assistant Examiner* — Ryan L Faulkner
(74) *Attorney, Agent, or Firm* — Amin, Turocy & Watson, LLP

(57) ABSTRACT

This vehicle cooling device includes a duct communicating with a heating element disposed in a vehicle, an opening provided in the duct, positioned below a seat surface part of a seat disposed above a floor panel, and opening to a passenger compartment, and a fan supplying air suctioned into the duct from the opening to the heating element, in which the opening is positioned on a vehicle-body rear side with respect to a seat fixing part on a vehicle-body front side among seat fixing parts for fixing the seat to the floor panel in a state in which it is disposed on a vehicle-body rear side of a front end of the seat surface part.

5 Claims, 6 Drawing Sheets

(56) References Cited

U.S. PATENT DOCUMENTS

| | | |
|---|---|---|
| 2012/0181827 A1 | 7/2012 | Aoki et al. |
| 2013/0092348 A1 | 4/2013 | Bito |
| 2014/0262573 A1 | 9/2014 | Ito et al. |
| 2015/0343891 A1 | 12/2015 | Honda et al. |
| 2017/0267059 A1 | 9/2017 | Koyama et al. |
| 2018/0015806 A1 | 1/2018 | Yasuda et al. |
| 2018/0345759 A1 | 12/2018 | Okumura |

FOREIGN PATENT DOCUMENTS

| | | |
|---|---|---|
| CN | 102582420 | 7/2012 |
| CN | 103917390 | 7/2014 |
| CN | 104884290 | 9/2015 |
| CN | 107206890 | 9/2017 |
| CN | 108290493 | 7/2018 |
| DE | 102012020103 | 4/2013 |
| JP | 2005-306239 | 11/2005 |
| JP | 2007-008443 | 1/2007 |
| JP | 2007-022350 | 2/2007 |
| JP | 2010-285070 | 12/2010 |
| JP | 2013-086539 | 5/2013 |
| JP | 2013-252731 | 12/2013 |
| JP | 2015-209115 | 11/2015 |
| JP | 2016-030518 | 3/2016 |
| JP | 2016-199105 | 12/2016 |
| JP | 2017-105275 | 6/2017 |
| JP | 2017-165305 | 9/2017 |
| JP | 2020-104532 | 7/2020 |
| JP | 2020-104580 | 7/2020 |
| WO | 2019/008870 | 1/2019 |

OTHER PUBLICATIONS

Chinese Notice of Allowance for Chinese Patent Application No. 202210136761.4 mailed Mar. 8, 2024.

* cited by examiner

VEHICLE COOLING DEVICE

CROSS-REFERENCE TO RELATED APPLICATION

The present application claims priority based on Japanese Patent Application No. 2021-048802, filed Mar. 23, 2021, the content of which is incorporated herein by reference.

BACKGROUND OF THE INVENTION

Field of the Invention

The present invention relates to a vehicle cooling device.

Description of Related Art

For example, a vehicle that travels with an electric motor as a drive source such as a hybrid vehicle includes an on-board power storage device that supplies electricity to the electric motor. A power storage device is mounted, for example, on a vehicle-body rear side of a rear seat (hereinafter referred to as a seat), and a battery is stored inside a case. The power storage device generates heat from cells constituting the battery when it is charged and discharged. The battery needs to remove generated heat by cooling to prevent deterioration in performance of the cells due to the heat.

As a vehicle cooling device for cooling a battery, for example, one in which an intake duct extending from a power storage device to a vehicle-body front side is disposed below a seat surface part (that is, a seat cushion) of a seat, and an intake port of the intake duct opens to a front end of the seat surface part is known. A recessed part is formed on a bottom surface of the seat surface part, and the intake duct is disposed in the recessed part. Therefore, the intake duct can be disposed below the seat surface part without raising a position of the seat surface part (that is, a seating position of an occupant).

According to this cooling device, for example, air in a passenger compartment is suctioned in by the intake duct, and the suctioned air is supplied to the battery by a blower fan or the like to cool the battery (see, for example, Japanese Unexamined Patent Application, First Publication No. 2013-86539).

SUMMARY OF THE INVENTION

Here, in the vehicle cooling device of Japanese Unexamined Patent Application, First Publication No. 2013-86539, the intake port of the intake duct is disposed at the front end of the seat surface part. Therefore, the intake port (that is, an opening) is visually noticeable to an occupant, and this leads to deterioration in external appearance. Also, since the intake port is disposed at the front end of the seat surface part, a distance to the occupant seated on the seat surface part becomes small Therefore, unwanted sound (noise) due to an air flow suctioned from the intake port is generated near the occupant, and it is difficult to secure quietness for the occupant.

Further, since the intake port is visually noticeable to the occupant, for example, a decorative grille is generally provided on the intake port in consideration of an external appearance, but this leads to an increase in costs.

An aspect of the present invention is directed to providing a vehicle cooling device in which an opening can be made unlikely to be visually noticeable to an occupant, an external appearance can be enhanced, and furthermore, unwanted sound due to an air flow suctioned from the opening can be reduced.

In order to achieve the above-described objective, a vehicle cooling device according to an aspect of the present invention employs the following configuration.

(1) An aspect of the present invention is a vehicle cooling device including a duct (for example, an intake duct 71 of an embodiment) communicating with a heating element (for example, a power storage device 18 of the embodiment) disposed in a vehicle (for example, a vehicle 10 of the embodiment), an opening (for example, an intake port 72 of the embodiment) provided in the duct, positioned below a seat surface part (for example, a seat cushion 31 of the embodiment) of a seat (for example, a seat 15 of the embodiment) disposed above a floor panel (for example, a floor panel 14 of the embodiment), and opening to a passenger compartment (for example, a passenger compartment 22 of the embodiment), and a fan (for example, a blower fan 64 of the embodiment) supplying air suctioned into the duct from the opening to the heating element, in which the opening is positioned on a vehicle-body rear side with respect to a seat fixing part (for example, a first seat fixing part 35 of the embodiment) on a vehicle-body front side among seat fixing parts (for example, the first seat fixing part 35 of the embodiment) for fixing the seat to the floor panel in a state in which it is disposed on a vehicle-body rear side of a front end (for example, a front end 31*a* of the embodiment) of the seat surface part.

According to the aspect (1) described above, the opening is provided in the duct, and the opening is disposed on a vehicle-body rear side with respect to the seat fixing part on a vehicle-body front side. The seat fixing part is disposed on a vehicle-body rear side of the front end of the seat surface part (seat cushion). Therefore, the opening of the duct can be disposed on a vehicle-body rear side of the front end of the seat surface part.

Thereby, the opening can be made unlikely to be visually noticeable to an occupant, an external appearance (appearance merchantability) can also be enhanced, and furthermore, unwanted sound (noise) due to an air flow suctioned from the opening can be reduced.

In addition, there is no need to provide, for example, a grille on the opening in consideration of an external appearance so that the opening can be made unlikely to be visually noticeable to the occupant, and thus costs can be reduced.

(2) In the aspect (1) described above, the opening may be an intake port (for example, the intake port 72 of the embodiment) for suctioning air in the passenger compartment, the duct may be an intake duct (for example, the intake duct 71 of the embodiment) for guiding the air suctioned from the intake port to the heating element, and the intake port may be positioned on a vehicle-body rear side with respect to a protruding part (for example, a first protruding part 46 and a second protruding part 47 of the embodiment) protruding in a vehicle-body upward direction from the floor panel below the seat surface part.

According to the aspect (2) described above, the intake port is disposed on a vehicle-body rear side of the protruding part. The protruding part protrudes in a vehicle-body upward direction from the floor panel below the seat surface part. Thereby, the protruding part can better prevent the intake port from entering an occupant's field of view, and the external appearance can be further enhanced.

Also, when the intake port is disposed on a vehicle-body rear side of the protruding part, a path through which foreign matter is mixed into the intake port from a vehicle-body front side of the seat surface part can be complicated by the protruding part. Thereby, foreign matter entering the intake port can be curbed.

(3) In the aspect (2) described above, an openable and closable lid (for example, a lid 53 of the embodiment) may be provided on the protruding part (for example, the first protruding part 46 of the embodiment) above a fuel tank (for example, a fuel tank 16 of the embodiment) provided below the floor panel, and the intake port may be positioned on a vehicle-body rear side of the lid.

According to the aspect (3) described above, the openable and closable lid is provided on the protruding part, and the lid is disposed above the fuel tank. The intake port is disposed on a vehicle-body rear side of the lid.

Here, the protruding part is configured to protrude upward. Therefore, accumulation of liquid and foreign matter on the protruding part can be curbed. When the lid is provided on the protruding part, for example, the lid can be used as an opening/closing part for maintenance (maintenance and inspection). Thereby, for example, at the time of maintenance of the fuel tank or the like provided in a lower space of the protruding part, the fuel tank or the like can be easily accessed by opening the lid.

(4) In the aspect (2) or (3) described above, the protruding part (for example, the second protruding part 47 of the embodiment) may be provided above a pressure valve (for example, a pressure valve 43 of the embodiment) which is provided in the fuel tank (for example, the fuel tank 16 of the embodiment) provided below the floor panel, and the intake port may be positioned on a vehicle-body rear side of the protruding part.

According to the aspect (4) described above, here, the pressure valve (a vent valve) needs to be provided at a highest position of the fuel tank. Therefore, the protruding part is provided above the pressure valve. Therefore, a space in which the pressure valve is disposed can be secured below the protruding part. Thereby, the pressure valve can be provided at the highest position of the fuel tank, and this enables space saving and an efficient disposition of components.

(5) In any one of the aspects (2) to (4) described above, the intake duct may include an inclined part (for example, an inclined flow path part 77 of the embodiment) which is inclined upward toward a downstream side in a flow path from the intake port to the heating element.

According to the aspect (5) described above, the inclined part is provided in the intake duct, and the inclined part is inclined upward toward a downstream side thereof. Thereby, even when a liquid or foreign matter enters the intake duct from the intake port, the inclined part can prevent the liquid or foreign matter from entering the heating element.

Also, when the inclined part is provided in the intake duct, the entire length of the intake duct can be extended and the intake duct can be bent. Therefore, a large distance from the fan to the intake port can be secured, and a bent part can be provided between the intake port and the fan. Thereby, unwanted sound of the fan that reaches the passenger compartment from the intake port through the intake duct can be reduced.

(6) In any one of the aspects (2) to (5) described above, the intake port may be positioned below an upper end (for example, an upper portion 17b of the embodiment) of a cross member (for example, a rear cross member 17 of the embodiment) extending in a vehicle width direction on a vehicle-body rear side of the seat and on a vehicle-body front side of the heating element.

According to the aspect (6) described above, the cross member is provided on a vehicle-body rear side of the seat and on a vehicle-body front side of the heating element. The intake port is positioned on a vehicle-body front side of the cross member and below the seat surface part. Here, for example, a configuration in which the cross member is provided at a position in which the passenger compartment and the luggage compartment are partitioned, the intake port is disposed in the passenger compartment, and the heating element is disposed in the luggage compartment is conceivable.

In this configuration, for example, it is known that the luggage compartment side generally reaches a high temperature compared to the passenger compartment. Also, it is known that the air warmed by the heating element reaches a high temperature. Therefore, it is conceivable that the high-temperature air on the luggage compartment side or the high-temperature air warmed by the heating element reach the intake port by natural convection.

Therefore, the intake port is made to be positioned below the cross member. Therefore, it is possible to prevent the high-temperature air on the luggage compartment side or the high-temperature air warmed by the heating element from reaching the intake port by natural convection. Thereby, air at a lower temperature can be suctioned into the intake duct from the intake port.

(7) Any one of the aspects (2) to (6) described above may further include an exhaust duct (for example, an exhaust duct 73 of the embodiment) which guides air guided to the passenger compartment through the intake duct, the heating element, and the fan, in which a downstream side of the exhaust duct (for example, a portion 83a on a downstream side of a second exhaust flow path part and a portion 85a on a downstream side of a fourth exhaust flow path part of the embodiment) may communicate with an exhaust space (for example, left and right exhaust spaces 88 and 89 of the embodiment) on a vehicle-body front side with respect to the seat surface part in a space (for example, a third exhaust flow path part 84 and a fifth exhaust flow path part 86 of the embodiment) between a side member (for example, left and right side frames 12 and 13 of the embodiment) extending in a vehicle-body front-rear direction and an interior material (for example, an interior material 25 of the embodiment) separating the side member from the passenger compartment, and the air which has been guided to the downstream side of the exhaust duct may be guided to the passenger compartment through the exhaust space.

According to the aspect (7) described above, the downstream side of the exhaust duct is configured to communicate with (connected to) the exhaust space. The exhaust space is disposed on a vehicle-body front side with respect to the seat surface part. Therefore, when the air that has been guided to the downstream side of the exhaust duct is guided to the exhaust space, the air that has been guided to the exhaust space can be guided to the passenger compartment on a vehicle-body front side with respect to the seat surface part.

Thereby, the air that has reached a high temperature due to the heating element can be guided to a position away from the intake port. Therefore, suctioning of the high-temperature air into the intake duct from the intake port can be curbed. Therefore, the heating element can be satisfactorily cooled by the air suctioned from the intake port, and cooling performance can be improved.

Also, the air guided to the exhaust space is guided to the passenger compartment on a vehicle-body front side with respect to the seat surface part, and thereby high-temperature air can be guided to a position away from a leg part of the occupant seated on the seat surface part. Thereby, a feeling of discomfort given to the occupant can be reduced by the high-temperature air that has been guided from the exhaust space.

According to the aspect of the present invention, the opening can be made unlikely to be visually noticeable to an occupant, an external appearance (appearance merchantability) can also be enhanced, and furthermore, unwanted sound (noise) due to an air flow suctioned from the opening can be reduced.

DESCRIPTION OF EMBODIMENTS

Figure 1:
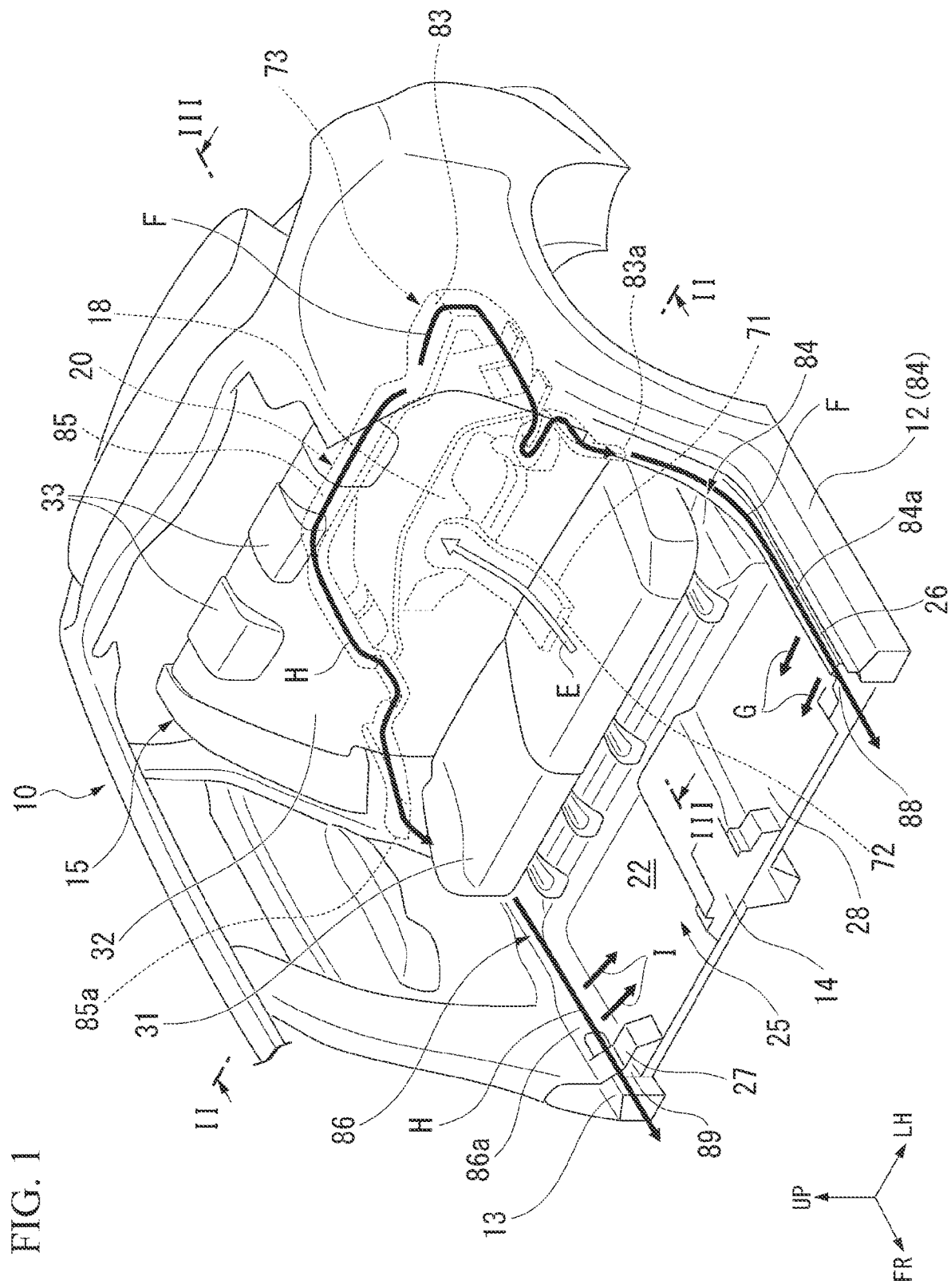
FIG. 1 is a perspective view illustrating a vehicle including a cooling device of one embodiment according to the present invention.

Hereinafter, a vehicle cooling device of an embodiment of the present invention will be described on the basis of the drawings. In the drawings, an arrow FR indicates toward the front of a vehicle, an arrow UP indicates toward the top of the vehicle, and an arrow LH indicates toward the left of the vehicle. Also, in the embodiment, for example, an example in which the present invention is applied to a two-row seat vehicle will be described, but as another example, the present invention may also be applied to, for example, a three-row seat vehicle.

Vehicle

Figure 2:
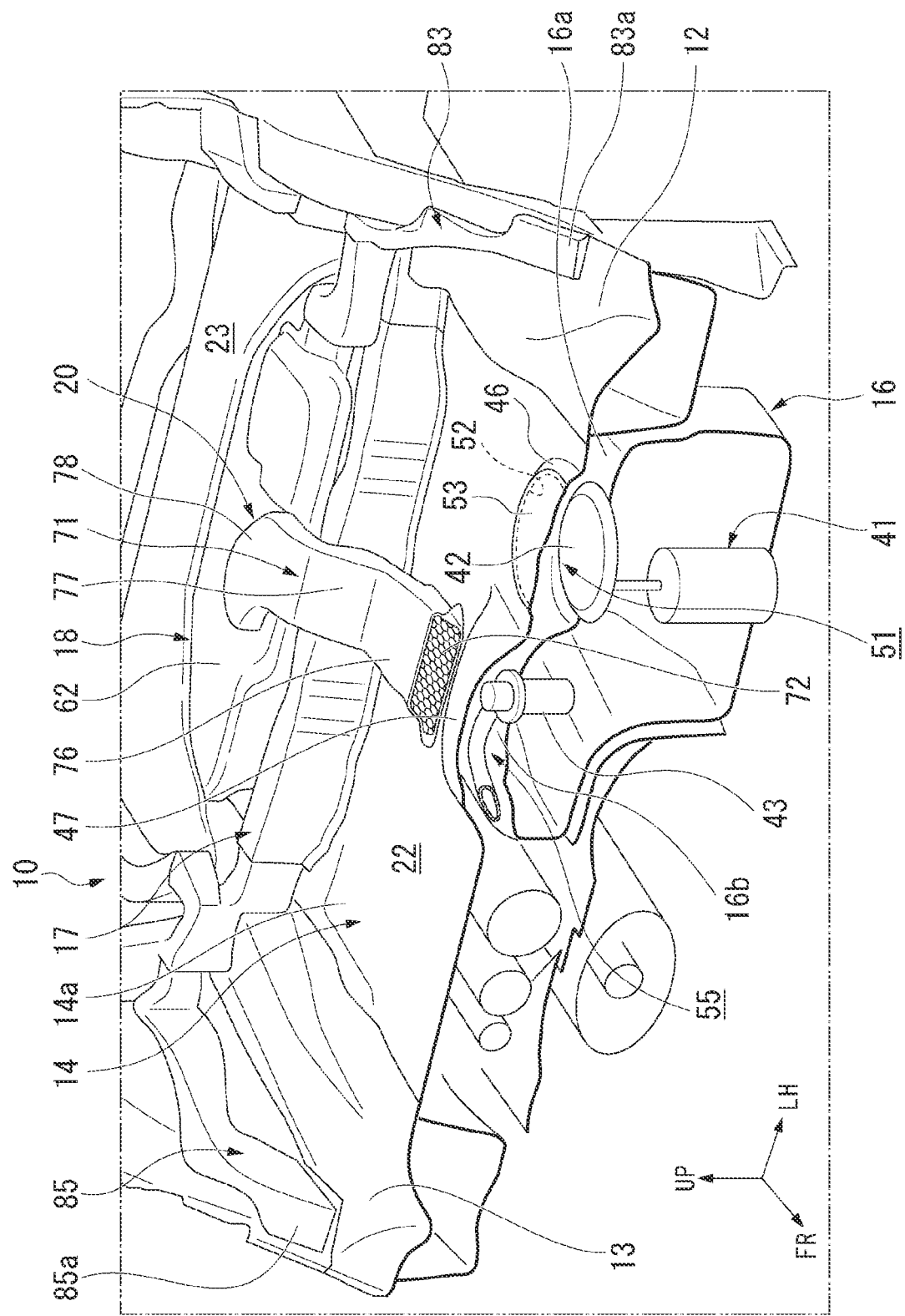
FIG. 2 is a perspective view illustrating a state in which the vehicle of FIG. 1 is cut along line II-II and a seat and an interior material are removed.

As illustrated in FIGS. 1 and 2, a vehicle 10 includes, for example, left and right side frames (side members) 12 and 13, a floor panel 14, a second-row rear seat (seat) 15, a fuel tank 16, a rear cross member (cross member) 17, a power storage device (heating element) 18, and a cooling device (vehicle cooling device) 20.

Further, the second-row rear seat 15 may be hereinafter abbreviated as a "seat 15."

Side Frame

The left side frame 12 extends in a vehicle body front-rear direction along a lower portion on a left outer side of a passenger compartment 22. The left side frame 12 is, for example, a hollow member formed in a rectangular closed cross section. The left side frame 12 constitutes a part of a third exhaust flow path part 84 to be described later.

The floor panel 14 is supported between the left side frame 12 and the right side frame 13. The floor panel 14 forms a floor surface of the passenger compartment 22. The left side frame 12 and the right side frame 13 are separated from the passenger compartment 22 by an interior material 25. The interior material 25 is formed by a left side trim 26, a right side trim 27, a carpet 28, and the like.

The left side trim 26 is disposed along, for example, the left side frame 12. The right side trim 27 is disposed along, for example, the right side frame 13. The carpet 28 is disposed on, for example, the entire region of the floor panel 14.

The left side frame 12 and the right side frame 13 are formed to be substantially bilaterally symmetrical. Therefore, the left side frame 12 will be described in detail below, and detailed description of the right side frame 13 will be omitted.

Seat

Figure 3:
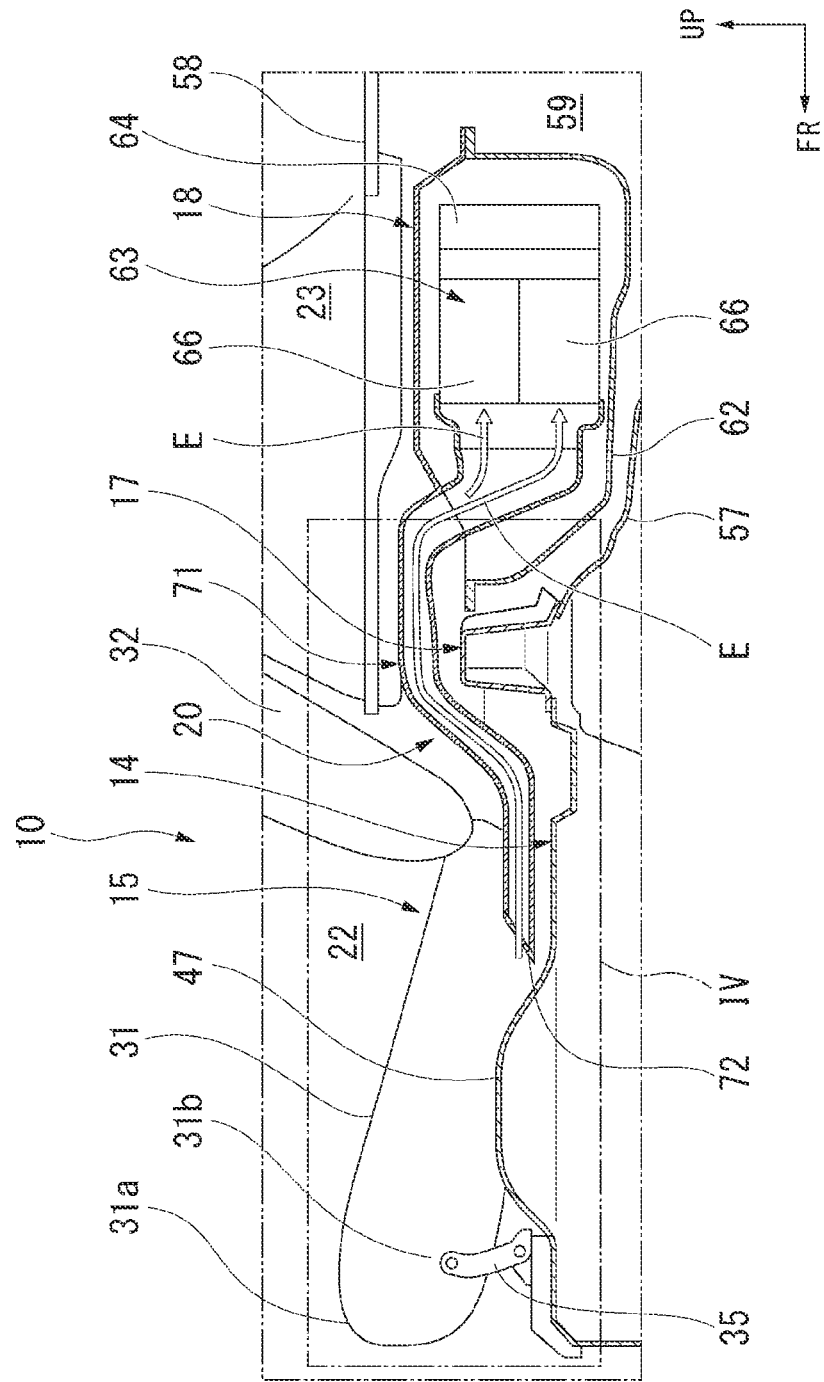
FIG. 3 is a cross-sectional view cut along line III-III of the vehicle of FIG. 1.
Figure 4:
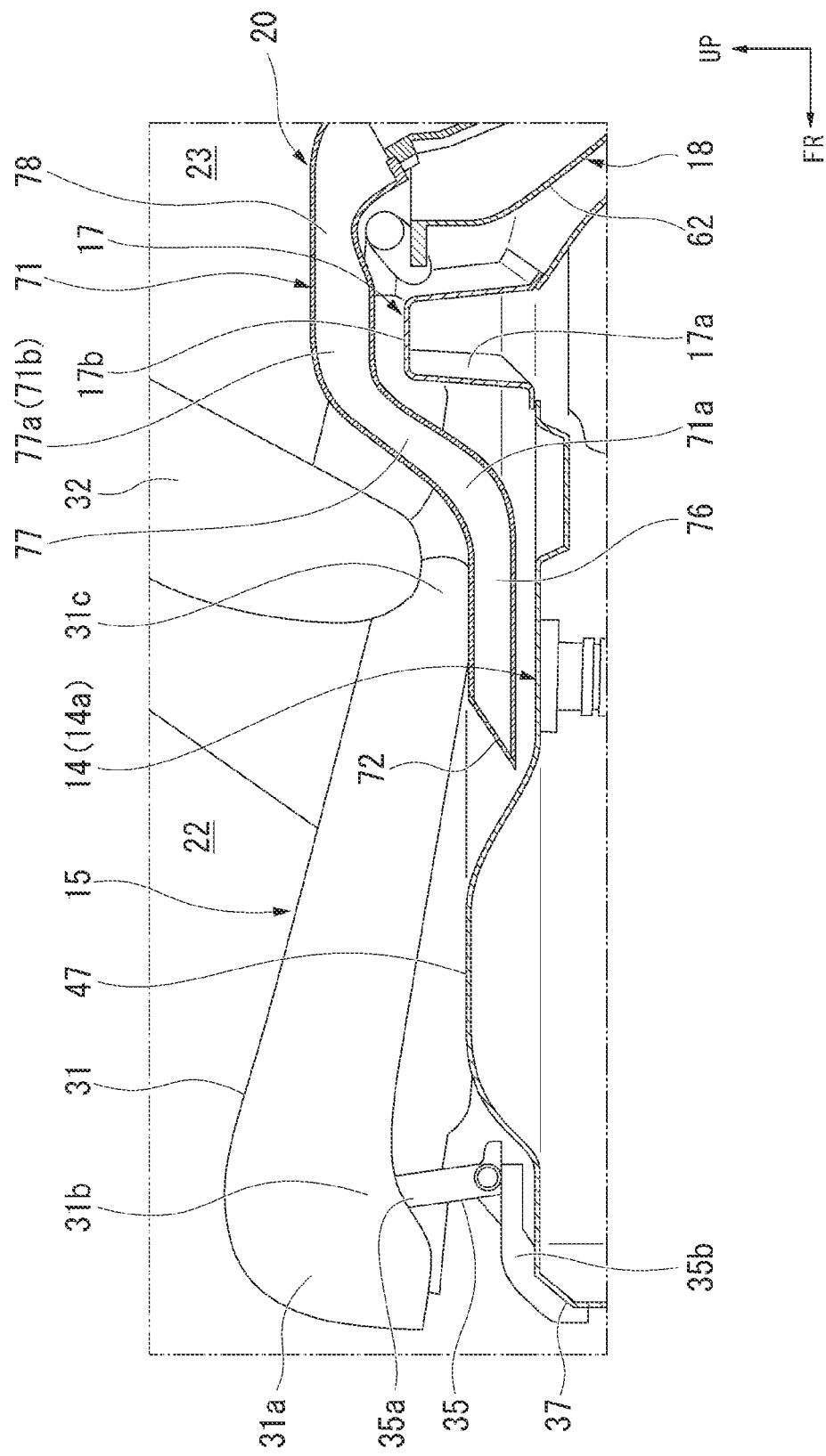
FIG. 4 is an enlarged cross-sectional view of the IV portion of FIG. 3.

As illustrated in FIGS. 3 and 4, the seat 15 is attached to the floor panel 14. The seat 15 includes a seat cushion (seat surface part) 31, a seat back 32, and a head rest 33 (see FIG. 1). The seat cushion 31 is a member that forms a seat surface on which an occupant sits. The seat cushion 31 is fixed to the floor panel 14 by a first seat fixing part (seat fixing part) 35 and a second seat fixing part (not illustrated).

That is, in the seat cushion 31, for example, an upper end portion 35a of the first seat fixing part 35 is disposed at a portion 31b on a vehicle-body rear side with respect to a front end 31a of the seat cushion 31 and close to the front end 31a. A lower end portion 35b of the first seat fixing part 35 is fixed to the floor panel 14 via a first cross member 37. Also, in the seat cushion 31, for example, a rear end portion 31c is attached to the second seat fixing part. In the second seat fixing part, for example, a lower end portion is fixed to the floor panel 14 via a second cross member (not illustrated).

Therefore, the seat cushion 31 is fixed to the floor panel 14 in a state of being disposed above the floor panel 14 by the first seat fixing part 35 and the second seat fixing part.

Fuel Tank

As illustrated in FIG. 2, the fuel tank 16 is disposed below the floor panel 14. A cap 42 of a fuel pump 41 and a pressure valve (vent valve) 43 are attached to an upper portion 16a of the fuel tank 16. That is, the cap 42 of the fuel pump 41 and the pressure valve 43 are disposed below the floor panel 14.

The fuel pump 41 supplies fuel of the fuel tank 16 to an engine (not illustrated). The pressure valve 43 keeps an internal pressure of the fuel tank 16 constant and communicates with a canister (not illustrated).

Floor Panel

As illustrated in FIGS. 2 and 4, the floor panel 14 includes a first protruding part (protruding part) 46 formed above the fuel tank 16 (specifically, the cap 42) and a second protruding part (protruding part) 47 formed above the pressure valve 43.

The first protruding part 46 and the second protruding part 47 protrude in a vehicle-body upward direction from a flat part 14a of the floor panel 14 below the seat cushion 31. The first protruding part 46 and the second protruding part 47 are disposed adjacent to each other in a vehicle width direction. The first protruding part 46 is formed on a left side on a vehicle-body front side of an intake port 72 to be described later. Also, the second protruding part 47 is formed on a vehicle-body front side of the intake port 72 to be described later.

The first protruding part 46 protrudes upward from the flat part 14a of the floor panel 14 above the cap 42 of the fuel tank 16. Therefore, a lower space 51 in which the cap 42 of the fuel pump 41 is disposed can be secured below the first protruding part 46. Thereby, the cap 42 of the fuel pump 41 can be provided on the upper portion 16a of the fuel tank 16, and this enables space saving and an efficient disposition of components.

Also, the first protruding part 46 has a maintenance opening 52 that opens to the top. The maintenance opening 52 is positioned above the cap 42 of the fuel pump 41. A lid 53 is attached to the maintenance opening 52 to be able to open and close the maintenance opening 52.

Here, the first protruding part 46 is configured to protrude upward. Therefore, accumulation of liquid and foreign matter on the first protruding part 46 can be curbed. When the lid 53 is provided on the first protruding part 46, for example, the lid 53 can be used as an opening/closing part for maintenance (maintenance and inspection) of the fuel tank 16 (particularly, the fuel pump 41) or the like. Thereby, for example, at the time of maintenance of the fuel pump 41 or the like provided in the lower space 51 of the first protruding part 46, the fuel pump 41 or the like can be easily accessed by opening the lid 53.

The second protruding part 47 protrudes upward from the flat part 14a of the floor panel 14 above the pressure valve 43.

Here, the pressure valve 43 needs to be provided at a highest portion (high position) 16b of the fuel tank 16. Therefore, the second protruding part 47 is provided above the pressure valve 43. Therefore, a lower space 55 in which the pressure valve 43 is disposed can be secured below the second protruding part 47. Thereby, the pressure valve 43 can be provided at the highest portion 16b of the fuel tank 16, and this enables space saving and an efficient disposition of components.

Rear Cross Member

As illustrated in FIGS. 2 to 4, the rear cross member 17 is provided on a vehicle-body rear side of the seat 15 and on a vehicle-body front side of the power storage device 18. The rear cross member 17 extends in a vehicle width direction in a state in which it is stretched between the left side frame 12 and the right side frame 13. The rear cross member 17 protrudes upward from the flat part 14a of the floor panel 14.

A luggage compartment pan 57 is provided toward the vehicle-body rear side from the rear cross member 17. The luggage compartment pan 57 is provided below a luggage compartment board (trunk board) 58. The luggage compartment board 58 forms a floor surface of a luggage compartment 23. The luggage compartment pan 57 is formed to be recessed downward in a concave shape from the luggage compartment board 58.

A storage space 59 in which the power storage device 18 can be stored (disposed) is formed between the luggage compartment board 58 and the luggage compartment pan 57.

Power Storage Device

Figure 5:
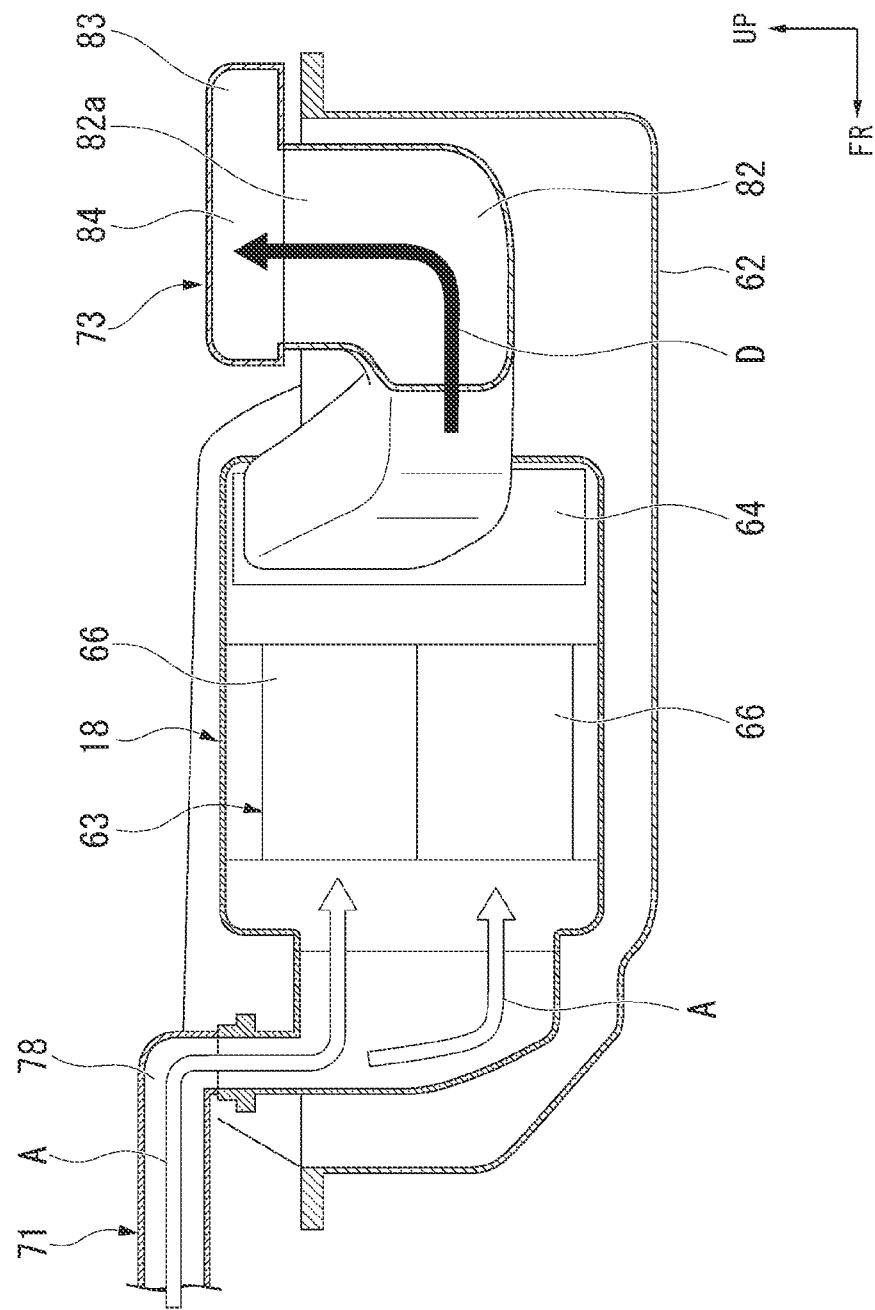
FIG. 5 is a side view illustrating a state in which an intake duct and an exhaust duct of the cooling device of one embodiment are connected to a power storage device.
Figure 6:
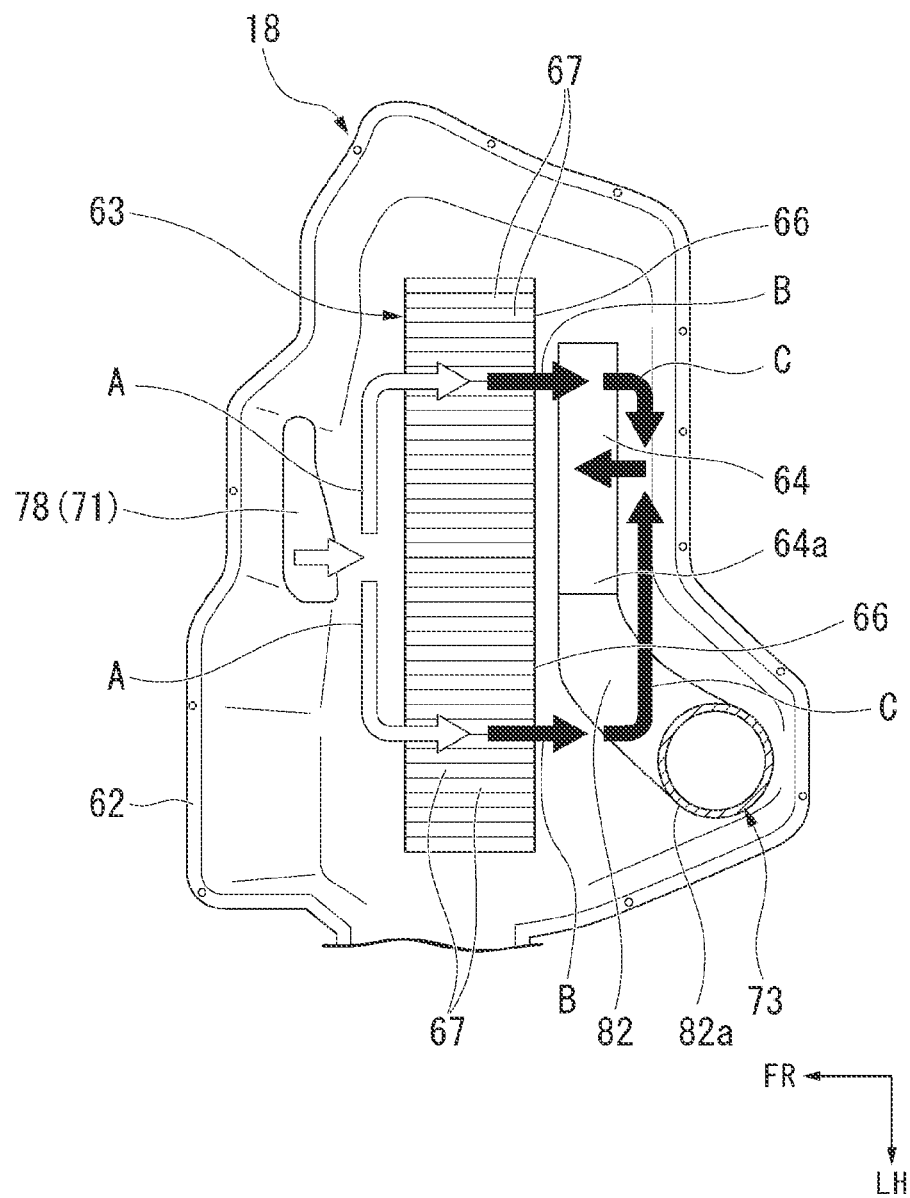
FIG. 6 is a plan view illustrating a state in which the intake duct and the exhaust duct of the cooling device of one embodiment are connected to the power storage device.

As illustrated in FIGS. 3, 5, and 6, the power storage device 18 is mounted in a state of being stored in the storage space 59 between the luggage compartment board 58 and the luggage compartment pan 57. The power storage device 18 includes a case 62, a battery module 63, a blower fan (fan) 64, and a control unit (not illustrated).

The battery module 63 is stored inside the case 62. In the battery module 63, for example, a plurality of batteries 66 are disposed in two upper and lower stages and are disposed in the vehicle width direction in the upper and lower stages. In each of the batteries 66, for example, a plurality of battery cells 67 are formed to be stacked longitudinally.

The blower fan 64 is stored on a vehicle-body rear side with respect to the battery module 63 inside the case 62.

When the blower fan 64 is driven, air in an intake duct 71 to be described later is guided to a vehicle-body front side of the battery module 63 as illustrated by an arrow A. Also, the air that has been guided to the vehicle-body front side of the battery module 63 is guided to the vehicle-body rear side of the battery module 63 along the battery module 63 as illustrated by an arrow B. The air that has been guided to the vehicle-body rear side of the battery module 63 is guided to the blower fan 64 as illustrated by an arrow C.

Thereby, the battery module 63 is cooled by the air guided from the intake duct 71 to be described later. The air that has cooled the battery module 63 is guided to an exhaust duct 73 (to be described later) through the blower fan 64 as illustrated by an arrow D. Further, the blower fan 64 also serves as a constituent member of the cooling device 20 to be described later.

As the control unit, for example, a high voltage junction board, an electronic control unit (ECU), or the like is disposed inside the case 62.

The high voltage junction board is, for example, an auxiliary device that supplies electricity of the battery module 63 to a drive motor (not illustrated). The ECU is, for example, a battery management unit that controls discharging and charging between the battery module 63 and the drive motor.

That is, the power storage device 18 is a power supply circuit control device in which the battery module 63 and the control unit are collectively stored inside the case 62.

Cooling Device

As illustrated in FIGS. 1 to 3, the cooling device 20 includes the intake duct (duct) 71, the intake port (opening) 72, the blower fan 64, and the exhaust duct 73.

The intake duct 71 extends from the intake port 72 to the case 62 and communicates with the inside of the case 62 from a portion of the case 62 on a vehicle-body front side. The intake duct 71 guides air suctioned from the intake port 72 from a portion of the case 62 on a vehicle-body front side to the inside of the case 62 as illustrated by an arrow E.

As illustrated in FIG. 4, the intake duct 71 is formed in a flow path from the intake port 72 to a portion of the case 62 on a vehicle-body front side. Specifically, the intake duct 71 includes a front horizontal flow path part 76, an inclined flow path part (inclined part) 77, and a rear horizontal flow path part 78.

The front horizontal flow path part 76 extends to the vehicle-body rear side along the floor panel 14 from the intake port 72 to the vehicle-body front side of the rear cross member 17.

The inclined flow path part 77 is formed substantially at a center in a longitudinal direction of the intake duct 71 and extends from a rear end portion of the front horizontal flow path part 76 to a front end portion of the rear horizontal flow path part 78. The inclined flow path part 77 is formed in a rising gradient to be inclined upward from the front horizontal flow path part 76 (that is, upstream side of the intake duct 71) toward the rear horizontal flow path part 78 (that is, downstream side of the intake duct 71).

Specifically, the inclined flow path part 77 is formed in a rising gradient to be inclined upward toward the vehicle-body rear side along a front wall part 17a of the rear cross member 17 on a vehicle-body front side of the rear cross member 17. In this state, an upper end portion 77a of the inclined flow path part 77 is positioned above an upper portion (upper end) 17b of the rear cross member 17.

The rear horizontal flow path part 78 extends horizontally toward the vehicle-body rear side from the upper end portion 77a of the inclined flow path part 77 to the case 62 via an upper side of the upper portion 17b of the rear cross member 17. The rear horizontal flow path part 78 communicates with the inside of the case 62 (that is, the vehicle-body front side of the battery module 63) from a portion of the case 62 on a vehicle-body front side.

Therefore, the intake duct 71 guides the air suctioned from the intake port 72 to the inside of the case 62 (that is, the vehicle-body front side of the battery module 63) through the front horizontal flow path part 76, the inclined flow path part 77, and the rear horizontal flow path part 78.

As illustrated in FIGS. 2 and 4, the intake port 72 is provided at a front end portion of the intake duct 71 (specifically, the front horizontal flow path part 76). The intake port 72 is disposed substantially at a center in the vehicle width direction and is positioned below the seat cushion 31. The intake port 72 opens to the passenger compartment 22 by, for example, forming a plurality of intake openings in a honeycomb shape. The intake port 72 suctions air in the passenger compartment 22 from the honeycomb-shaped intake openings and then guides it to the intake duct 71. Here, when the intake port 72 is formed of the honeycomb-shaped intake openings, for example, foreign matter or the like entering the intake duct 71 through the intake port 72 is curbed.

Here, the intake port 72 is positioned below the seat cushion 31 and is positioned on a vehicle-body rear side with respect to the first seat fixing part 35.

Also, the intake port 72 is positioned on a vehicle-body rear side with respect to the first protruding part 46 and the lid 53. Further, the intake port 72 is positioned on a vehicle-body rear side with respect to the second protruding part 47.

In addition, the intake port 72 is positioned on a lower side than the upper portion 17b of the rear cross member 17.

Further, the reason why the intake port 72 is disposed on a vehicle-body rear side from the first seat fixing part 35, the first protruding part 46, the lid 53, and the second protruding part 47, and furthermore, the intake port 72 is disposed on a lower side than the upper portion 17b of the rear cross member 17 will be described in detail later.

As illustrated in FIGS. 3 and 6, the blower fan 64 is stored on a vehicle-body rear side with respect to the battery module 63 inside the case 62. The blower fan 64 supplies the air suctioned into the intake duct 71 from the intake port 72 to the battery module 63 and the control unit.

As illustrated in FIGS. 1, 5, and 6, the exhaust duct 73 communicates with a discharge port 64a of the blower fan 64. The exhaust duct 73 is constituted by a first exhaust flow path part 82, a second exhaust flow path part 83, and a fourth exhaust flow path part 85.

The second exhaust flow path part 83 communicates with the third exhaust flow path part 84 to be described later. The fourth exhaust flow path part 85 communicates with the fifth exhaust flow path part 86 to be described later.

The first exhaust flow path part 82 communicates with the discharge port 64a of the blower fan 64, and a flow path opening 82a opens to the outside of the case 62. The second exhaust flow path part 83 and the third exhaust flow path part 84 communicate with the flow path opening 82a of the first exhaust flow path part 82.

As illustrated in FIGS. 1 and 2, the second exhaust flow path part 83 extends to a left side of the vehicle from the flow path opening 82a (see FIG. 5) of the first exhaust flow path part 82. A portion 83a on a downstream side of the second exhaust flow path part 83 communicates with the third exhaust flow path part (space) 84 formed between the left side frame 12 and the interior material 25 (the left side trim 26 and the carpet 28). That is, the left side frame 12 constitutes a part of the third exhaust flow path part 84 as described above.

The third exhaust flow path part 84 includes a left exhaust space 88 and a plurality of left exhaust ports (not illustrated). The left exhaust space 88 is formed at a portion 84a on a downstream side of the third exhaust flow path part 84 and is positioned on a vehicle-body front side with respect to the seat cushion 31. The plurality of left exhaust ports are formed at the portion 84a on the downstream side of the third exhaust flow path part 84 and communicate with the left exhaust space 88. That is, the plurality of left exhaust ports communicate with the passenger compartment 22 on a vehicle-body front side with respect to the seat cushion 31.

The fourth exhaust flow path part 85 extends to a right side of the vehicle from the flow path opening 82a (see FIG. 5) of the first exhaust flow path part 82. A portion 85a on a downstream side of the fourth exhaust flow path part 85 communicates with the fifth exhaust flow path part (space) 86 formed between the right side frame 13 and the interior material 25 (the right side trim 27 and the carpet 28). That is, the right side frame 13 constitutes a part of the fifth exhaust flow path part 86.

The fifth exhaust flow path part 86 includes a right exhaust space 89 and a plurality of right exhaust ports (not illustrated). The right exhaust space 89 is formed at a portion 86a on a downstream side of the fifth exhaust flow path part 86 and is positioned on a vehicle-body front side with respect to the seat cushion 31. The plurality of right exhaust ports are formed at the portion 86a on the downstream side of the fifth exhaust flow path part 86 and communicate with the right exhaust space 89. That is, the plurality of right exhaust ports communicate with the passenger compartment 22 on a vehicle-body front side with respect to the seat cushion 31.

As illustrated in FIGS. 1, 5, and 6, the air that has been guided to the blower fan 64 is guided to the passenger compartment 22 through the exhaust duct 73, the third exhaust flow path part 84, and the fifth exhaust flow path part 86.

Specifically, when the blower fan 64 is driven, the air that has cooled the battery module 63 is guided to the first exhaust flow path part 82 through the blower fan 64 as illustrated by the arrow D. The air that has been guided to the first exhaust flow path part 82 is guided to the third exhaust flow path part 84 through the second exhaust flow path part 83 as illustrated by the arrow F. The air that has been guided to the third exhaust flow path part 84 is guided from the left exhaust space 88 to the passenger compartment 22 through the plurality of left exhaust ports as illustrated by an arrow G.

Also, the air that has been guided to the first exhaust flow path part 82 is guided to the fifth exhaust flow path part 86 through the fourth exhaust flow path part 85 as illustrated by an arrow H. The air that has been guided to the fifth exhaust flow path part 86 is guided from the right exhaust space 89 to the passenger compartment 22 through the plurality of right exhaust ports as illustrated by an arrow I.

That is, the exhaust duct 73, the third exhaust flow path part 84, and the fifth exhaust flow path part 86 guide the air that has been guided to the intake duct 71, the power storage device 18, and the blower fan 64 to the passenger compartment 22.

The second exhaust flow path part 83 and the third exhaust flow path part 84 are formed to be substantially bilaterally symmetrical with respect to the fourth exhaust flow path part 85 and the fifth exhaust flow path part 86. Therefore, the second exhaust flow path part 83 and the third exhaust flow path part 84 will be described in detail below, and detailed description of the fourth exhaust flow path part 85 and the fifth exhaust flow path part 86 will be omitted.

As described above, according to the cooling device 20 of the embodiment, as illustrated in FIG. 4, the intake port 72 is provided in the intake duct 71, and the intake port 72 is disposed on a vehicle-body rear side with respect to the first seat fixing part 35 on a vehicle-body front side. The first seat fixing part 35 is disposed on a vehicle-body rear side of the front end 31a of the seat cushion 31. Therefore, the intake port 72 of the intake duct 71 can be disposed on a vehicle-body rear side of the front end 31a of the seat cushion 31.

Thereby, the intake port 72 can be made unlikely to be visually noticeable to the occupant, an external appearance (appearance merchantability) can also be enhanced, and furthermore, unwanted sound (noise) due to an air flow suctioned from the intake port 72 can be reduced.

In addition, there is no need to provide, for example, a decorative grille on the intake port in consideration of an external appearance so that the intake port 72 can be made unlikely to be visually noticeable to the occupant, and thus costs can be reduced.

Also, as illustrated in FIGS. 2 and 4, the intake port 72 is disposed on a vehicle-body rear side of the first protruding part 46 and the second protruding part 47. Specifically, the intake port 72 is disposed on a vehicle-body rear side of the second protruding part 47 and on a right side of the second protruding part 47. Also, the intake port 72 is disposed on a vehicle-body rear side of the second protruding part 47.

The first protruding part 46 and the second protruding part 47 protrude in a vehicle-body upward direction from the flat part 14a of the floor panel 14 below the seat cushion 31. Thereby, the first protruding part 46 and the second protruding part 47 can better prevent the intake port 72 from entering occupant's field of view, and the external appearance can be further enhanced.

Also, when the intake port 72 is disposed on a vehicle-body rear side of the first protruding part 46 and the second protruding part 47, a path through which foreign matter is mixed into the intake port 72 from the vehicle-body front side of the seat cushion 31 can be complicated by the first protruding part 46 and the second protruding part 47. Thereby, foreign matter entering the intake port 72 can be curbed.

Further, the inclined flow path part 77 is provided in the intake duct 71, and the inclined flow path part 77 is inclined upward toward a downstream side thereof. Thereby, even when a liquid or foreign matter enters the intake duct 71 from the intake port 72, the inclined part can prevent the liquid or foreign matter from entering the inside of the case 62.

Also, when the inclined flow path part 77 is provided in the intake duct 71, the entire length of the intake duct 71 can be extended and the intake duct 71 can be bent. Therefore, a large distance from the blower fan 64 to the intake port 72 can be secured, and a first bent part 71a and a second bent part 71b can be provided between the intake port 72 and the blower fan 64. Thereby, unwanted sound of the blower fan 64 that reaches the passenger compartment 22 from the intake port 72 through the intake duct 71 can be reduced.

In addition, the rear cross member 17 is provided on a vehicle-body rear side of the seat 15 and on a vehicle-body front side of the power storage device 18. Also, the intake port 72 is positioned on a vehicle-body front side of the rear cross member 17 and below the seat cushion 31. Here, for example, the rear cross member 17 is provided at a position in which the passenger compartment 22 and the luggage compartment 23 are partitioned, the intake port 72 is disposed in the passenger compartment 22, and the power storage device 18 is disposed in the luggage compartment 23.

In this configuration, for example, it is known that the luggage compartment 23 side generally reaches a high temperature compared to the passenger compartment 22. Also, it is known that the air warmed by the power storage device 18 reaches a high temperature. Therefore, it is conceivable that the high-temperature air on the luggage compartment 23 side or the high-temperature air warmed by the power storage device 18 reach the intake port 72 of the passenger compartment 22 past the rear cross member 17 by natural convection.

Therefore, the intake port 72 is made to be positioned below the rear cross member 17. Therefore, the high-temperature air on the luggage compartment 23 side or the high-temperature air warmed by the power storage device 18 reaching the intake port 72 by natural convection can be curbed. Thereby, air at a low temperature can be suctioned into the intake duct 71 from the intake port 72.

Also, as illustrated in FIG. 1, the third exhaust flow path part 84 communicates with the second exhaust flow path part 83 of the exhaust duct 73. The left exhaust space 88 of the third exhaust flow path part 84 is disposed on a vehicle-body front side with respect to the seat cushion 31. Also, the plurality of left exhaust ports communicate with the passenger compartment 22 on a vehicle-body front side with respect to the seat cushion 31. Therefore, the air that has been guided to the third exhaust flow path part 84 can be guided to the passenger compartment 22 on a vehicle-body front side with respect to the seat cushion 31 from the plurality of left exhaust ports through the left exhaust space 88.

Thereby, the air that has reached a high temperature due to the power storage device 18 can be guided to a position away from the intake port 72. Therefore, suctioning of the high-temperature air into the intake duct 71 from the intake port 72 can be curbed. Therefore, the power storage device 18 can be satisfactorily cooled by the air suctioned from the intake port 72, and cooling performance can be improved.

Further, the air guided to the left exhaust space 88 is guided from the plurality of left exhaust ports to the passenger compartment 22 on a vehicle-body front side with respect to the seat cushion 31, and thereby high-temperature air can be guided to a position away from a leg part of the occupant seated on the seat cushion 31. Thereby, a feeling of discomfort given to the occupant can be reduced by the high-temperature air that has been guided from the plurality of left exhaust ports through the left exhaust space 88.

Further, the technical scope of the present invention is not limited to the above-described embodiments, and various modifications can be made within a range not departing from the meaning of the present invention.

For example, in the above-described embodiment, an example in which the protruding part is constituted by the first protruding part 46 and the second protruding part 47 has been described, but the present invention is not limited thereto. As another example, for example, the first protruding part 46 and the second protruding part 47 may be collectively formed into one protruding part.

Also, in the above-described embodiment, an example in which the rear seat 15 in a two-row seat vehicle is used as a seat has been described, but the present invention is not limited thereto. As another example, for example, a second-row seat of a three-row seat vehicle may be used as the seat.

Further, in the above-described embodiment, the power storage device 18 has been exemplified as a heating element, but the heating element is not limited to the power storage device 18.

In addition, the components in the above-described embodiments can be appropriately replaced with well-known components within a range not departing from the meaning of the present invention, and the modified examples described above may be appropriately combined.

What is claimed is:

1. A vehicle cooling device comprising:
    a duct communicating with a heating element disposed in a vehicle;
    an opening provided in the duct, positioned below a seat surface part of a seat disposed above a floor panel, and opening to a passenger compartment; and
    a fan supplying air suctioned into the duct from the opening to the heating element, wherein
    the opening is positioned on a vehicle-body rear side with respect to a seat fixing part on a vehicle-body front side among seat fixing parts for fixing the seat to the floor panel in a state in which it is disposed on a vehicle-body rear side of a front end of the seat surface part,
    the opening is an intake port for suctioning air in the passenger compartment,
    the duct is an intake duct for guiding the air suctioned from the intake port to the heating element,
    the intake port is positioned on a vehicle-body rear side with respect to a protruding part protruding in a vehicle-body upward direction from the floor panel below the seat surface part,
    the protruding part is provided above a pressure valve which is provided in the fuel tank provided below the floor panel, and
    the intake port is positioned on a vehicle-body rear side of the protruding part.

2. The vehicle cooling device according to claim 1, wherein
    an openable and closable lid is provided on the protruding part above a fuel tank provided below the floor panel, and
    the intake port is positioned on a vehicle-body rear side of the lid.

3. The vehicle cooling device according to claim 1, wherein the intake duct includes an inclined part which is inclined upward toward a downstream side in a flow path from the intake port to the heating element.

4. The vehicle cooling device according to claim 1, wherein the intake port is positioned below an upper end of a cross member extending in a vehicle width direction on a vehicle-body rear side of the seat and on a vehicle-body front side of the heating element.

5. The vehicle cooling device according to claim 1, further comprising:
    an exhaust duct which guides air guided to the passenger compartment through the intake duct, the heating element, and the fan, wherein
    a downstream side of the exhaust duct communicates with an exhaust space on a vehicle-body front side with respect to the seat surface part in a space between a side member extending in a vehicle-body front-rear direction and an interior material separating the side member from the passenger compartment, and
    the air which has been guided to the downstream side of the exhaust duct is guided to the passenger compartment through the exhaust space.

* * * * *